United States Patent [19]
Ito et al.

[11] Patent Number: 5,513,983
[45] Date of Patent: May 7, 1996

[54] APPARATUS FOR VITRIFYING SOOT PREFORM FOR OPTICAL FIBER

[75] Inventors: Masumi Ito; Ichiro Tuchiya; Toshio Danzuka; Yuichi Ohga; Sumio Hoshino, all of Yokohama, Japan

[73] Assignee: Sumitomo Electric Industries, Inc., Osaka, Japan

[21] Appl. No.: 255,875

[22] Filed: Jun. 8, 1994

[30] Foreign Application Priority Data

Jun. 8, 1993 [JP] Japan .................... 5-137474

[51] Int. Cl.⁶ .................................. F27B 5/04
[52] U.S. Cl. .................. 432/205; 432/124; 432/128; 432/163; 432/167; 432/200; 432/207
[58] Field of Search .................. 432/124, 128, 432/163, 167, 200, 205, 207

[56] References Cited

U.S. PATENT DOCUMENTS

| | | |
|---|---|---|
| 4,969,941 | 1/1990 | Kyoto et al. . |
| 4,977,307 | 12/1990 | Motoi et al. ............... 219/392 |
| 5,000,682 | 3/1991 | Heidt et al. ............... 432/241 |
| 5,032,079 | 7/1991 | Tsuchiya et al. . |
| 5,114,338 | 5/1992 | Tsuchiya et al. . |
| 5,236,482 | 8/1993 | Danzuka et al. . |

FOREIGN PATENT DOCUMENTS

| | | |
|---|---|---|
| 0232077 | 8/1987 | European Pat. Off. . |
| 0405580 | 1/1991 | European Pat. Off. . |
| 0416614 | 3/1991 | European Pat. Off. . |
| 0420148 | 4/1991 | European Pat. Off. . |
| 0529694 | 3/1993 | European Pat. Off. . |
| 0547560 | 6/1993 | European Pat. Off. . |
| 4362035 | 6/1991 | Japan .................... 432/205 |
| 9323341 | 11/1993 | WIPO . |

OTHER PUBLICATIONS

Patent Abstract of Japan, vol. 17, No. 225 (C–1055) 10 May 1993 & JP-A-04 362 035 (Sumitomo Electric Industries Ltd.) 15 Dec. 1992.
Patent Abstracts of Japan, vol. 12, No. 5 (C–467) Jan. 8, 1988 & JP-A-62 162 636 (Hitachi Cable Ltd.) Jul. 18, 1987.
Patent Abstracts of Japan, vol. 14, No. 417 (C–756) Sep. 10, 1990 & JP-A-02 160 636 (Sumitomo Electric Industries Ltd.) Jun. 20, 1990.
Patent Abstracts of Japan, vol. 14, No. 261 (C–725) Jun. 6, 1990 & JP-A-02 074 533 (Sumitomo Electric Industries Ltd.) Mar. 14, 1990.
Patent Abstracts of Japan, vol. 13, No. 466 (C–646) Oct. 20, 1989 & JP-A-01 183 430 (Sumitomo Electric Industries Ltd.) Jul. 21, 1989.

Primary Examiner—Henry A. Bennett
Assistant Examiner—Siddmarth Ohri
Attorney, Agent, or Firm—Cushman Darby & Cushman

[57] ABSTRACT

An apparatus for vitrifying a soot preform from which an optical fiber is produced by drawing, is composed of a main vacuum chamber 20 in which a muffle tube 70 for vitrifying the soot preform PF is located, and an auxiliary vacuum chamber 30 mounted on the main vacuum chamber 20 and communicated therewith through a passage, and a gate valve 60 for opening and closing the passage. The muffle tube 70 has a inner surface covered with silicon carbide layer 70a.

36 Claims, 13 Drawing Sheets the
APPARATUS FOR VITRIFYING SOOT PREFORM FOR OPTICAL FIBER

BACKGROUND OF THE INVENTION

1. Field of the Invention

The present invention relates to an apparatus for vitrifying soot preforms from which optical fiber are produced.

2. Related Background Art

Optical fibers or Glass fiber lightguides have been used for a transmission path for optical communication. Optical fiber is fabricated from the preform. As a method of producing preforms from which optical fibers are formed by drawing, the so-called VAD (Vapor Phase Axial Deposition) process and OVD (Outside vapor Phase Deposition) process have been known.

This VAD or OVD process is based on flame hydrolysis. This VAD or OVD process includes the step of sintering soot preforms which are aggregation of glass particles so as to be porous. U.S. Pat. Nos. 5,032,079; 5,114,338; 5,236,482; and 4,969,941 disclose apparatus for sintering the above-mentioned soot preforms.

SUMMARY OF THE INVENTION

One object of the present invention is to provide an apparatus for vitrifying soot preforms for optical fibers, which can improve the through-put of the products.

The apparatus according to the present invention comprising a main vacuum chamber, a heater, a muffle tube, an auxiliary vacuum chamber, a gate valve and a transfer robot.

That is, the apparatus comprises a main vacuum chamber adapted to be set a first condition of a predetermined pressure; a muffle tube, for accommodating the soot preform, provided in the main vacuum chamber, the muffle tube including a graphite tube with base and a SiC layer covering on an inner wall of the graphite tube; a heater system for heating the soot preform, the heater system provided in the main vacuum chamber and located so as to surround the muffle tube; an auxiliary vacuum chamber adapted to be set a second condition of a predetermined pressure, the auxiliary vacuum chamber attached to the main vacuum chamber; and a transfer robot for supporting and rotating the soot preform, the transfer robot transferring the soot preform from the main vacuum chamber to the auxiliary vacuum chamber, and the soot preform accommodated in the muffle tube is vitrified by heating under negative pressure.

The apparatus further comprising a rod for jointing the soot preform to the transfer robot, the rod surrounded by the soot preform.

The main vacuum chamber is used for heating the preforms, comprising an opening through which the preforms can be introduced thereinto. The heater system such as an electrical furnace, is incorporated in the main vacuum chamber. The muffle tube is formed of a graphite tube covered at its inner wall surface with a silicon carbide layer, and is opened to the opening side of the main vacuum chamber. Graphite is a crystal made of carbon. In other wards, the muffle tube is made of a material containing carbon.

Further, the muffle tube is surrounded by a heater system located in the main vacuum chamber. It is noted that the muffle tube is completely located within the main vacuum chamber inside of which is evacuated up to a pressure lower than 10 Pa by a pump. It is noted that the term "vacuum" is defined here so as to exhibit a condition under a pressure below 10 Pa.

The auxiliary vacuum chamber is attached to the main vacuum chamber, opposing the opening of the main vacuum chamber. The gate valve is laid between the main vacuum chamber and the auxiliary vacuum chamber. The gate valve can open and close a passage which communicates the inside of the main vacuum chamber with the auxiliary vacuum chamber, Gas pressure in the main vacuum chamber and gas pressure in auxiliary vacuum chamber are controllable independently.

With the use of the gate valve, the main vacuum chamber and the auxiliary vacuum chamber can be evacuated, independent from each other. After the main vacuum chamber is evacuated, a preform is loaded in the auxiliary vacuum chamber under the atmospheric pressure.

After the auxiliary vacuum chamber is evacuated, the gate valve is opened. Thereafter, the preform is shifted into the main vacuum chamber in which the preformed is heated by the heater system. After the preform is vitrified by this heating, the gate valve is opened, and then the preform is returned into the auxiliary vacuum chamber before the gate valve is closed.

After the pressure of the auxiliary vacuum chamber is returned to the atmospheric pressure, the vitrified preform can be taken out from the auxiliary vacuum chamber. Since the preform has been heated up to a temperature of higher than 1,000 deg. C. in the main vacuum chamber, several hours are required for naturally cooling the main vacuum chamber down to a temperature less than 100 deg. C. However, according to the present invention, the preform can be taken out before the main vacuum chamber is cooled down.

Since the auxiliary chamber is evacuated, contamination including moisture is easily evaporated in comparison with evaporation under the atmospheric pressure. The contamination and the evaporated contamination are easily introduced into the main vacuum chamber if the gate valve is opened. The graphite from which the muffle tube is formed, can resist against a high temperature above the 1,000 deg. C., and also can serves as active carbon. The muffle tube according to the present invention, has the silicon carbide layer with which the inner surface of the muffle tube is covered, and accordingly, no contamination including moisture is absorbed into the graphite. That is, the main vacuum chamber can be easily evacuated.

Further, with the provision of the auxiliary vacuum chamber, the preform can be taken out before the main vacuum chamber is cooled down, thereby it is possible to greatly enhance the through-put of the products in comparison with conventional apparatus.

The auxiliary vacuum chamber has a door which is laid on one side surface of the auxiliary vacuum chamber so as to be openable and closable. A door seal is laid between the door and the auxiliary vacuum chamber body. After the door is opened, the inside of the auxiliary vacuum chamber can be easily observed. With the use of the door seal, the gas-tightness can be enhanced remarkably.

A transfer robot (conveying mechanism) is adapted to hold the rod surrounded by the soot preform, that is, the transfer robot shifts the soot preform from the inside of the auxiliary vacuum chamber into the inside of muffle tube through the opening of the main vacuum chamber. Further, the transfer robot rotates the soot preform in the muffle tube.

The transfer robot incorporates a holding member made of graphite having its surface from which substantially no carbon is evaporated even though it is heated up to a temperature higher than 1,000 deg. C., and accordingly, it is possible to prevent carbon in the form of contamination from being introduced into the preform.

The rod surrounded by the soot preform is held by this holding member. If the holding member is made of graphite coated thereover with silicon carbide, the introduction of contamination into the soot preform can be further more prevented.

The holding member has a recess having a size which allows the rod to be fitted in the recess. The holding member has through-holes which pierce from the inner wall of the recess to the outer surface of the holding member. By inserting a pin into these through-holes, the rod surrounded by the preform can be easily fixed to the holding member.

The transfer robot further incorporates a support rod, a rotary device, and an elevator. The support rod is attached or connected to the holding member. The rotary device rotates the support rod around the axis of the support rod, and the elevator moves the support rod longitudinally of the muffle tube. Therefore, the rod and the preform surrounding the rod is controlled so as to be elevated between the main vacuum chamber and auxiliary vacuum chamber and rotated in the muffle tube.

The transfer robot incorporates a cover member having a through-hole through which the holding member extends. The holding member limits the movement of the cover member toward the main vacuum chamber side from the support member. The cover member is made of graphite which may be coated with silicon carbide. The cover member formed of graphite or that coated with silicon carbide, can approach the muffle tube in comparison with the member made of glass. Accordingly, the cover member can efficiently confine heat radiated from the muffle tube, inside thereof. With the use of this cover member, it is possible to restrain consumption of power.

The muffle tube is composed of a first cylindrical member, a second cylindrical member, a third cup-like member and a seal. The second member is attached on the first member so as to form a cylindrical shape in combination, and the third member is attached underneath the first member. The seal which is formed of a resilient member containing carbon is laid between the first and second members. With the use of this seal, no heat leaks between the first and second members.

The coated silicon carbide layer applied on the inner wall surface of the muffle tube has a thickness of 50 to 250 μm. By setting the thickness of the silicon carbide layer in this range, the use life of the muffle tube during which preforms excellently vitrified are produced, can be pro longed.

The apparatus according to the present invention incorporates a heat insulator which is laid in the main vacuum chamber, around the heater system, and which is made of graphite.

The apparatus according to the present invention incorporates a first exhaust device and a second exhaust device. The first exhaust device expels gas from the auxiliary vacuum chamber. The pressure in the auxiliary vacuum chamber is measured with a first vacuum gage. The second exhaust device expels gas from the main vacuum chamber. The opening and closing of the gate valve is controlled by a gate valve control device. The vacuum gage and the gate valve control device are connected to a computer which controls the gate control valve so as to open the gate valve when the degree of vacuum measured by the vacuum gage comes to a predetermined value.

Further, the apparatus according to the present invention incorporates an elevator control device for controlling the elevator, which is connected to the computer. The computer controls the gate valve control device so as to open the gate valve, and also controls the elevator control device so as to convey the preform into the main vacuum chamber while controls the rotary device in order to rotate the preform.

The apparatus also incorporates a power supply connected to the heater system, and a power control device connected between the power supply and the heater system. The power control device controls the degree of power fed to the heater system from the power supply. The apparatus incorporates a thermometer for measuring the temperature of the inside of the main vacuum chamber. The first vacuum gage, the gate valve control device, the elevator control device, the rotary device, the power control device and the thermometer are connected to the computer.

The computer controls the gate valve control device so as to open the gate valve, and also controls the elevator control device so as to convey the reform into the main vacuum chamber while controls the rotary device so as to rotate the reform, when the degree of vacuum measured by the vacuum gage comes to a predetermined value. The computer controls the power control device so as to increase the degree of power fed to the heater system. The computer control the elevator so as to return the preform into the auxiliary vacuum chamber after the time with which the preform can be vitrified elapses from the time when the temperature of the main vacuum chamber measured by the thermometer comes to a value which enough to vitrify the preform. After the preform is returned into the auxiliary vacuum chamber, the computer controls the gate valve control device so as to close the gate valve.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 1:
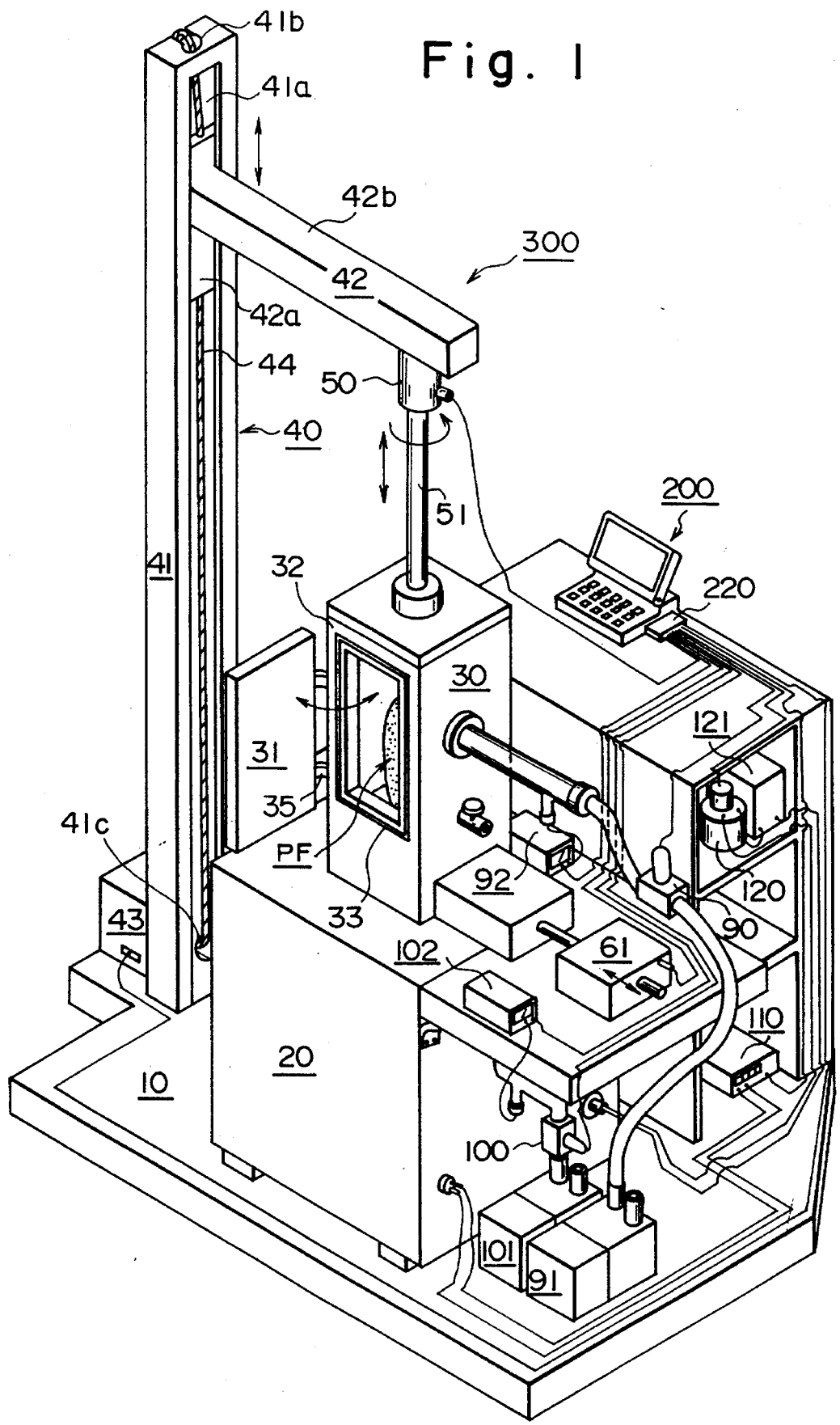
FIG. 1 is a perspective view illustrating an apparatus according to the present invention.

Explanation will be hereinbelow made of an embodiment of the present invention. It is noted throughout the description hereinbelow that identical reference numerals are used to denote identical parts, the terms "upper" and "lower" should be referred to the drawings. The apparatus according to the present invention is used to sinter a soot preform.

Figure 2:
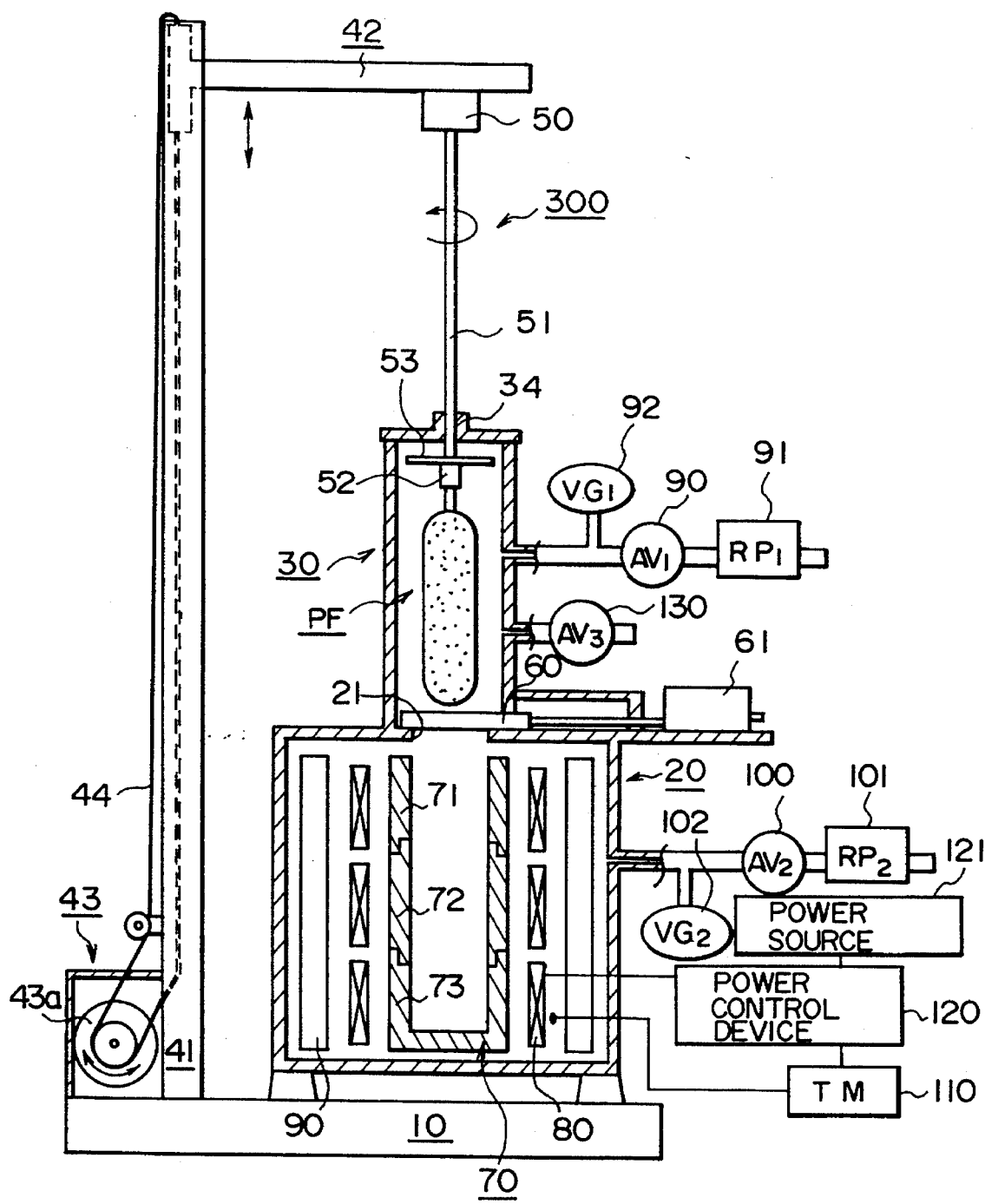
FIG. 2 is a sectional view illustrating the apparatus shown in FIG. 1, a gate valve being closed.

FIG. 1 is a perspective view illustrating the apparatus according a one embodiment of the present invention, and FIG. 2 is a vertical sectional view illustrating the apparatus shown in FIG. 1;

A main vacuum chamber 20 is installed on a base 10. The main vacuum chamber 20 has an opening 21 at its upper part. An auxiliary vacuum chamber (load lock chamber) 30 mounted on the main vacuum chamber 20 through the intermediary of the opening 21. A gate valve 60 is laid between the auxiliary vacuum chamber 30 and the main vacuum chamber 20. The gate valve 60 can open and close a passage which communicate the inside of the main vacuum chamber 20 with the inside of the auxiliary vacuum chamber 10. As shown FIG. 2, when the gate valve 60 is closed, gas existing in the main vacuum chamber 20 and gas existing in the auxiliary vacuum chamber 30 are isolated from each other, and the gas pressures in their insides are controlled, independent from each other. When the gate valve 60 is opened, the main vacuum chamber 20 and the auxiliary vacuum chamber 30 are communicated with each other so that the gas pressures in their inside become equal to each other.

A muffle tube 70 is located in the main vacuum chamber 20. The muffle tube 70 is opened toward the opening 21. A heater system 80 is laid around the muffle tube 70. A heat insulator 90 is arranged around the heater system 80. The muffle tube 70 is formed of graphite, the inner surface thereof being coated with silicon carbide (SIC).

The apparatus according to the present invention comprises a transfer robot 300 which holds a preform PF, and which shifts the preform PF from the inside of the auxiliary vacuum chamber 30 into the inside of the muffle tube 70 through the opening 21 of the main vacuum chamber 20. The transfer robot 300 rotates the preform PF in the muffle tube 70.

The transfer robot 300 is composed of an elevator 40, a rotary device 50, a support rod 51, a holding member 52 and a cover member 53.

A though-hole 34 is formed in the upper portion of the auxiliary vacuum chamber 30, piercing vertically therethrough. The seed rod (support rod) 51 extends through the through-hole 34. The holding member 52 is attached to the lower end portion of the seed rod 51. The electric motor (rotary device) 50 is attached to the upper end portion of the seed rod 51. The rotary shaft of the electric motor 50 is aligned with the axis of the seed rod 51. When the electric motor 50 is operated, the seed rod 51 is rotated thereby, and accordingly, the preform PF is rotated.

The electric motor 50 is fixed to the elevator 40 which incorporates a support member 41, and a rotary device support member 42. The support member 41 extends upward from the base 10. The support member 41 has a groove 41a along its longitudinal direction. The rotary device support member 42 has a T-like shape. The head part 42a of the T-like shape of the rotary device support member 42 can be moved up and down along the groove 41a. The rotary device 50 is held by the leg part 42b of the T-like shape of the rotary device support member 42, and accordingly it can be moved vertically.

The elevation of the elevator 40 is controlled by an elevator control device 43. Through-holes 41b, 41c are formed in the upper and lower potion of the support member 41, piercing through the support member 41. The elevator control device 43 incorporates a motor 43a having its rotary shaft which extends in a direction perpendicular to the plane of FIG. 2. A belt 44 is attached to the head part 42a of the T-like shape of the rotary device support member 42. The belt 44 passes through the through-holes 41b, 41c, and is wound on the rotary shaft of the motor 43a. When the motor 43a is operated, the belt 44 pulls the rotary device support member 42 which is therefor moved up and down.

The auxiliary vacuum chamber 30 incorporates an auxiliary vacuum chamber body 32 and a door 31 which is attached to one side outer surface of the auxiliary vacuum chamber body 32 so as to be openable and closable. One portion of the door 31 is connected to one portion of the vacuum chamber body 32 by a hinge 35, and these two potions are located at the same height. Since the door 31 is horizontally opened, a operator can easily observe the holding member 52 after opening the door 31, and accordingly, the operator can easily attach the preform PF to the holding member 52. A door seal 33 is laid between the door 31 and the auxiliary vacuum chamber body 32. The door seal 33 is made of rubber.

A first rotary pump 91 is connected to the auxiliary vacuum chamber 30 through the intermediary of a first air valve 90. The first air valve 90 and the first rotary pump 91 constitutes a first exhaust device. The auxiliary vacuum chamber 30 is evacuated with the first rotary pump 91. The first air valve 90 can be opened and closed so as to control the exhaust of gas in the auxiliary vacuum pump 91. A first vacuum gage 92 is attached to the auxiliary vacuum chamber 30. Absolute gas pressure of the auxiliary vacuum chamber 30 is measured with the first vacuum gage 92. An air valve 130 is connected to the auxiliary vacuum chamber 30. When the air valve 130 is opened, the pressure of the auxiliary vacuum chamber 30 is equal to normal atmospheric pressure.

A second rotary pump 101 is connected to main vacuum chamber 20 through the intermediary of a second air valve 100. The secondary air valve 100 and the second rotary pump 101 constitute a second exhaust device.

The main vacuum chamber 20 is evacuated with the second rotary pump, so that gas existed in the main vacuum chamber is exhausted. The second air valve 100 can be opened and closed so as to control the exhaust of gas. A second vacuum gage 102 is attached to the main vacuum chamber 20. Absolute gas pressure of the main vacuum chamber 20 is measured with the second vacuum gage 102.

A temperature sensor 110 is located in the vicinity of the heater system 80. The temperature of the heater system 80 is measured with the temperature sensor 110. That is, the heating temperature of the preform PF is 110 indirectly measured with the temperature sensor 110.

The heater system 80 is connected to a power supply 121 via the power control device 120 such as a transformer. Power is applied to the heater system 80 from the power supply 121, and supply of the power is controlled by the power control device 120. The power supply 121 feeds a power to the heater system 80, and the power control device 120 control the degree of power fed to the heater system 80.

The opening and closing of the gate valve 60 is controlled by a gate vale control device 61. The gate valve control device 61, the first air valve 90, the second air valve 100, the rotary device 50, the elevator control device 43, the first vacuum gage 91, the second vacuum gage 102, the power control device 120 and the temperature sensor 110 are connected to a computer 200 through the intermediary of an interface 220.

Next, explanation will be made of how to fix the preform PF to the apparat ds shown in FIGS. 1 and 2, with reference to FIGS. 3 and 4.

Figure 3:
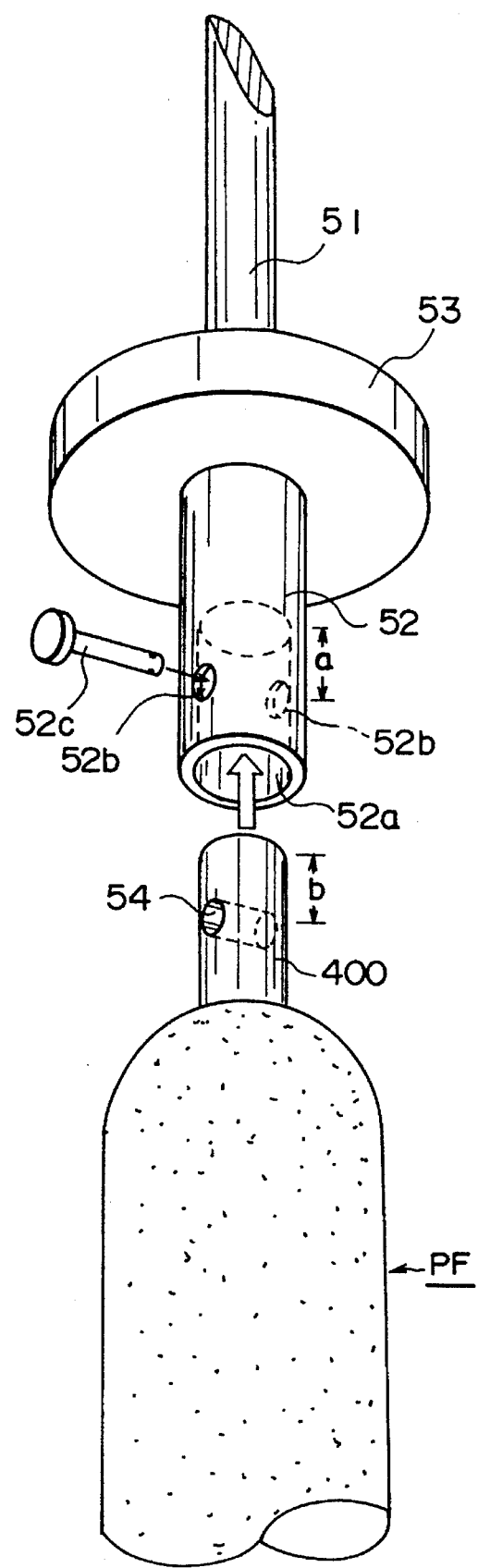
FIG. 3 is a perspective view illustrating a holding member, a cover member and a preform.
Figure 4:
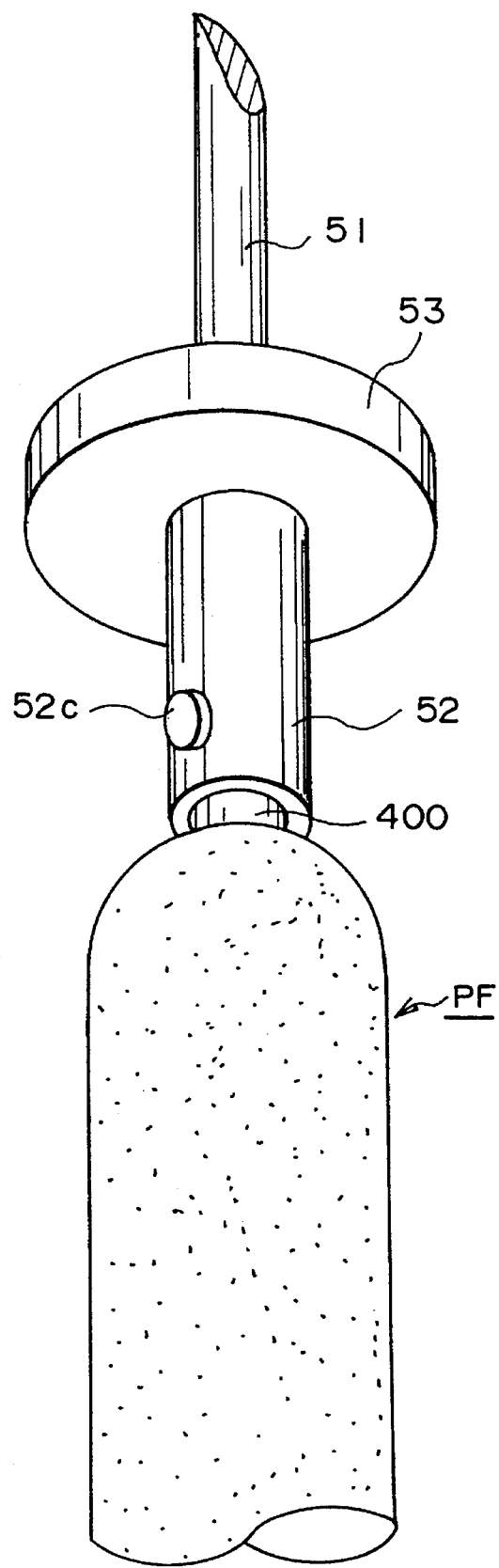
FIG. 4 i s a perspective view illustrating the holding member, the cover member and the preform, the preform being fixed to the holding member.

When the door 31 provided to the auxiliary vacuum chamber 30 shown in FIG. 1 is opened, the holding member 52, the cover member 53 and the support rod 51 can be seen as shown in FIG. 3. The cover member 53 and the holding member 52 are made of graphite. The outer surfaces of the cover member 53 and the holding member 52 may be coated thereover with silicon carbide.

Submicron size glass particles are deposited on a mandrel, rod, target rod or seed rod 400, and soot boule or preform PF is made of the glass particles. The rod 400 is surrounded by the preform PF. The holding member 52 formed therein a recess 52a having a size which allows the rod 400 to be fitted in the recess 52a. Through-holes 52b piercing from the inner wall surface of the recess 52a to the outer wall surface of the holding member 52 are formed in the holding member 52. The rod 400 has a through-hole 54 orthogonal to the longitudinal direction thereof. The distance a between the bottom of the recess 52a and the through-holes 52b is equal to the distance b between the through-hole 54 and the top end of the rod end 400. When the soot preform PF is inserted into the recess 52a, the through-holes 52b is easily aligned with the through-hole 54 since the distances a, b are equal to each other. A pin 52c is inserted through the aligned through-holes 52b, 54, as shown in FIG. 4, so as to fix the soot preform PF to the holding member 52.

Figure 5:
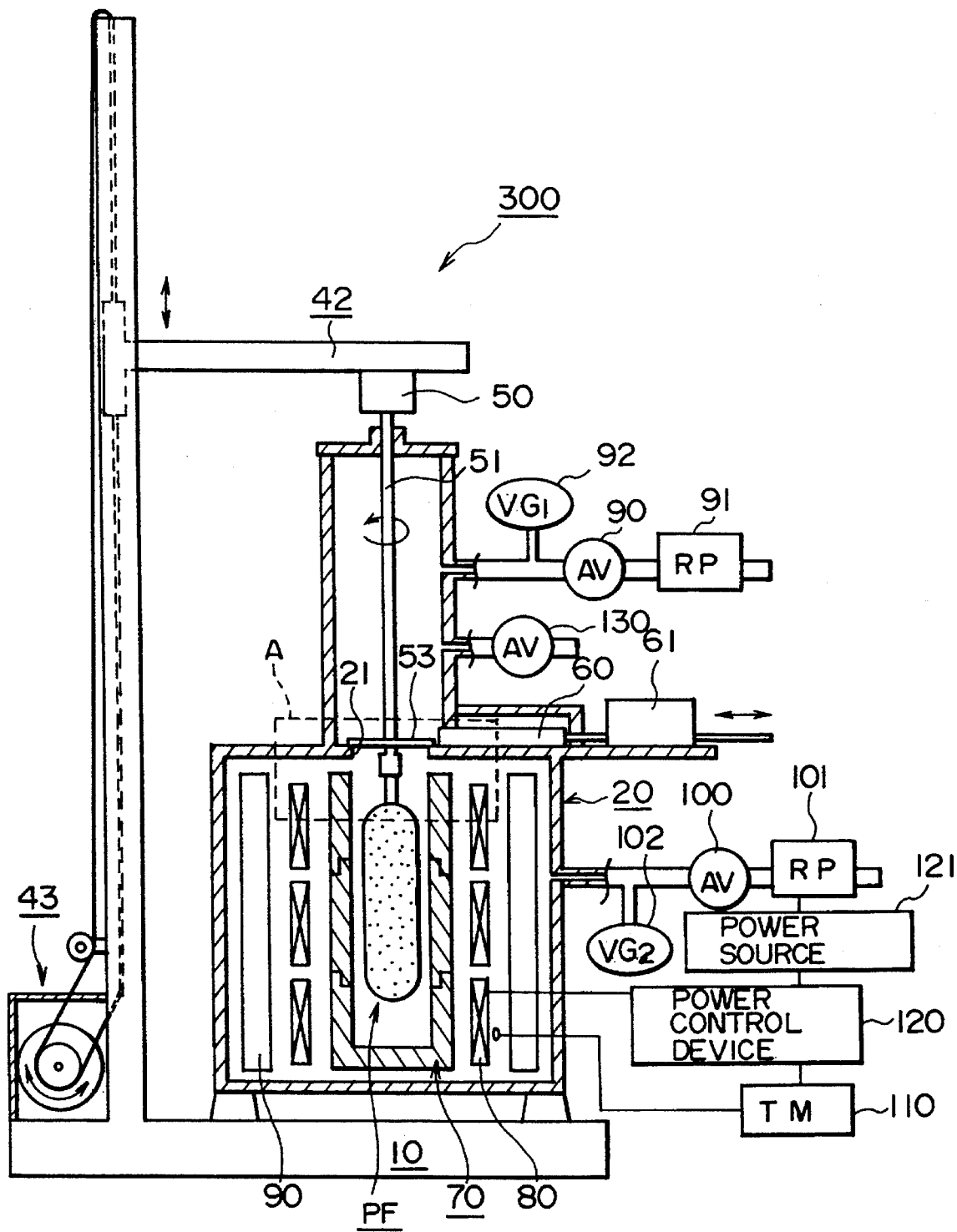
FIG. 5 is a sectional view illustrating the apparatus shown in FIG. 1, the gate valve being opened.

After the soot preform PF is fixed to the holding member 51, the door 31 shown in FIG. 1 is closed. Estimation is made such that the main vacuum chamber 20 is already evacuated by the second rotary pump 101. Gas existing in the auxiliary vacuum chamber 30 is exhausted from the auxiliary vacuum chamber 30 by the first rotary pump 91. When the pressure in the auxiliary vacuum chamber 30 comes to 10 Pa, the gate valve 60 is operated so as to be opened by the gate control device 61, as shown in FIG. 5. The elevator 40 is moved by the elevator control device 43 so as to introduce the preform PF into the main vacuum chamber 20. Then, the cover member 53 is caught by a surface at the periphery of the opening 21 in the main vacuum chamber 20.

Figure 6:
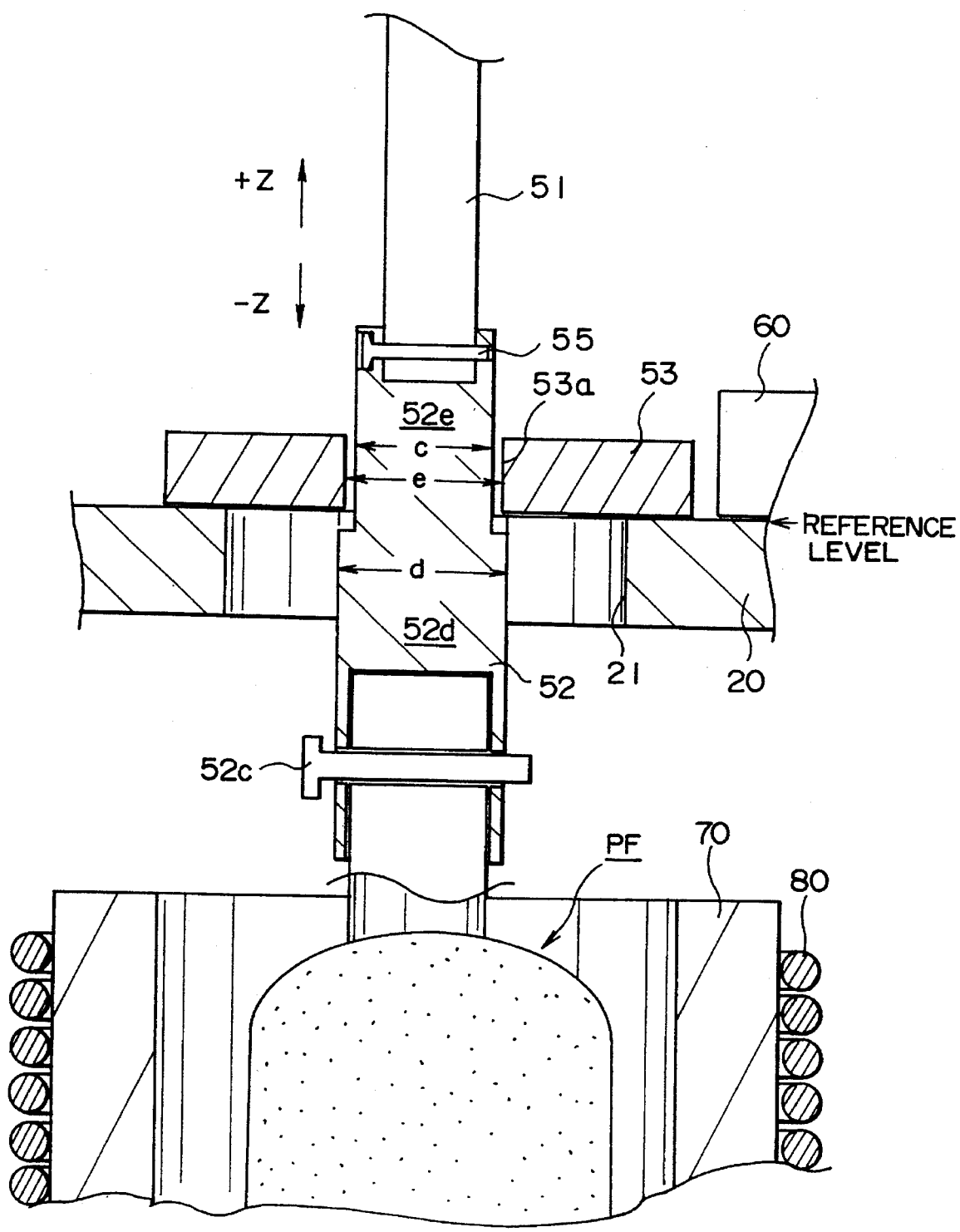
FIG. 6 is a sectional view illustrating the holding member and the cover member.

FIG. 6 is an enlarge view which shows an area A surrounded by the dot-line in FIG. 5. The cover member 53 has a size such that it can cover the opening 21. The cover member 53 is formed therein with a through-hole 53a which pierces through the cover member 53 in the thicknesswise direction thereof. The holding member 52 extends through the through-hole 53a. Further, the holding member 52 has two portions 52e, 52d, and the potions 52e, 52d has a diameter c, d orthogonal to the longitudinal direction thereof, respectively.

The diameter of the through-hole 53a is set to a value e which is larger than the diameter c of the holding member 52 but smaller than the diameter d thereof. The portion 52d having the diameter d of the holding member 52 is located below the potion 52e having the diameter c of the holding member 52. It is noted that the upper end of the 20 is set as a reference level. When the holding member 52 is moved in the direction of the arrow +Z from the reference level, the cover member 53 is caught by the portion 52d, and accordingly, the cover member 53 is also moved in the direction –Z of the arrow together with the holding member 52. When the holding member 52 is moved in the direction of the arrow –Z from the reference level, the cover member 53 is not caught by the part 53e, so that the cover member 53 is not moved in the direction of the arrow –Z from the reference level. The support member 51 and the holding member 52 are coupled together by means of a pin 55.

Next, explanation will be made of the muffle tube 70 as shown in FIG. 2 and FIG. 5.

Figure 7:
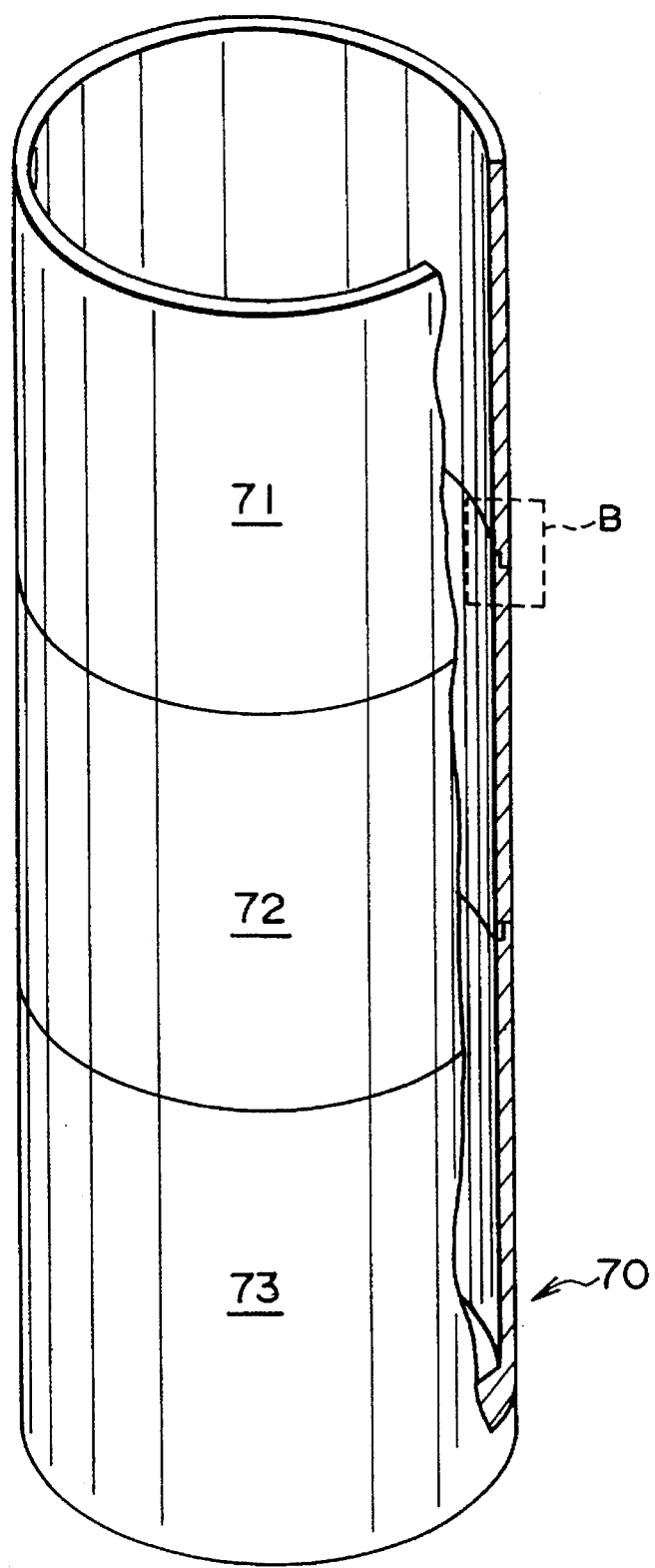
FIG. 7 is a perspective illustrating a muffle tube which is shown being partly broken.

FIG. 7 is a perspective view illustrating the muffle tube 70 which is shown being partly broken. The muffle tube 70 has an inner diameter of 300 mm and a height of 600 mm.

The muffle tube 70 is composed of a first cylindrical member 71, a second cylindrical member 72 and a third-cup-like member 73. The second member 72 is attached on the third member 73, and the first member 71 is attached on the second member 72.

The opening end portion of the third member 72 has a stepped sectional shape, as shown in FIG. 7. The upper and lower end portions of the second member 72 have also stepped sectional shapes, respectively, as shown in FIG. 7. The opening end part of the third member 73 is fitted onto the lower end part of the second member 72. The upper end part of the second member 72 is fitted onto the lower end part of the first member 71.

Figure 8:
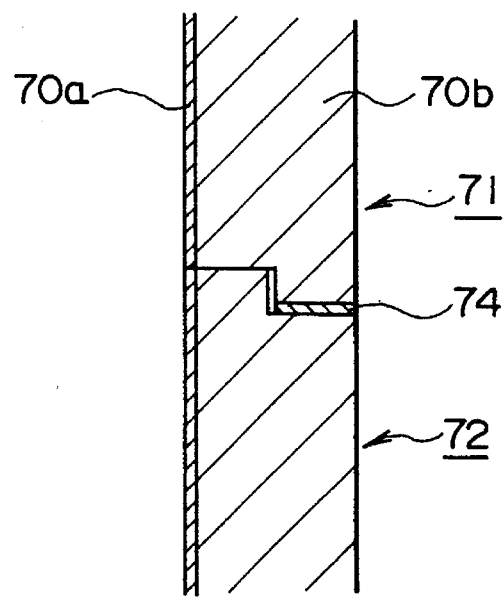
FIG. 8 is an enlarged view illustrating an area B surrounded by a dot line shown in FIG. 7.

FIG. 8 is an enlarged sectional view illustrating an area B surrounded by the dot line shown in FIG. 7. The muffle tube 70 is formed of graphite 70b, the inner surface of which is covered with a silicon carbide layer 70a. In the apparatus according to the present invention, the muffle tube 70 is located in a vacuum chamber. Contamination such as moisture existing in the auxiliary vacuum chamber 30 shown in the FIG. 1 is readily evaporated in comparison with a condition under the atmosphere. Contamination and evaporated contamination are introduced into the main vacuum chamber 20 when the gate valve 60 is opened.

The graphite constituting the muffle tube 70 can resist against a temperature of about 1,000 deg. C., and also serves an active carbon. In the muffle tube 70 according to the present invention, the outer surface of the graphite is covered with silicon carbide, and accordingly, no contamination such as moisture is not absorbed into the graphite. With the apparatus according to the present invention, in which no contamination is absorbed into the graphite, the inside of the main vacuum chamber 20 can be readily evacuated.

Figure 9:
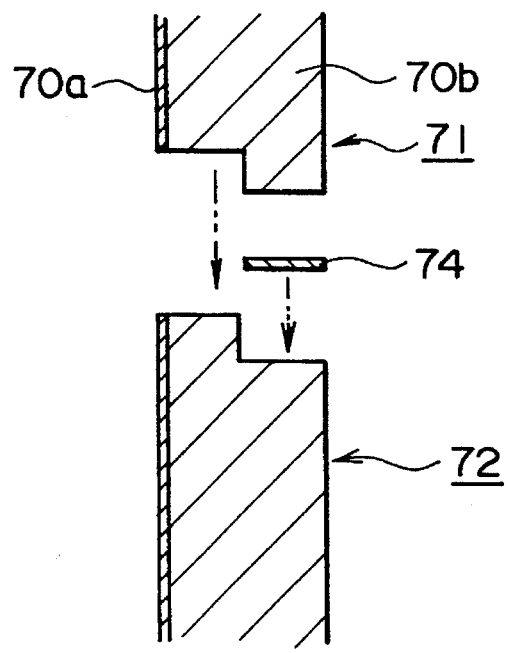
FIG. 9 is an enlarged view illustrating the area B surrounded by the dot line shown in FIG. 7.

A resilient member 74 containing carbon is laid between the first and second members 71, 72 so as to serve as a seal. The resilient member 74 has a thickness of 0.5 mm. FIG. 9 is a sectional view illustrating the first and second members 71, 72 which are shown being separated from each other. The resilient member 74 is interposed between the outer stepped part of the first member 71 and the outer stepped part of the second member 72. This resilient member 74 is made of a heat-resistant material which is not melted up to a temperature higher than the heating temperature for the preform PF to be processed in the main vacuum chamber 20.

With the use of this resilient member 74, the capacity of heat leaking between the first and second members 71, 72 can be greatly reduced. The use of the resilient member can reduce the consumption of power to be fed to the heater system 80 in comparison with the case of using no resilient member 74, and since no heat leaks from the muffle tube 74, the soot preform PF can be uniformly heated.

After the preform PF is vitrified by this heating, the gate valve 60 is opened again. The preform PF is returned into the auxiliary vacuum chamber 30, and then the valve 60 is closed.

When the pressure in the auxiliary vacuum chamber 30 is returned to the atmospheric pressure, the vitrified preform PF can be taken out from the auxiliary vacuum chamber 30. Since the preform PF has been heated up to a temperature higher then 1,000 deg. C. in the main vacuum chamber 20, several hours are required for naturally cooling the inside of the main vacuum chamber 20 down to a temperature lower than 100 deg. C. However, with the apparatus according to the present invention, since the auxiliary vacuum chamber 30 is provided, the vitrified preform can be taken out before the inside of the main vacuum chamber 20 is cooled down.

Figure 10:
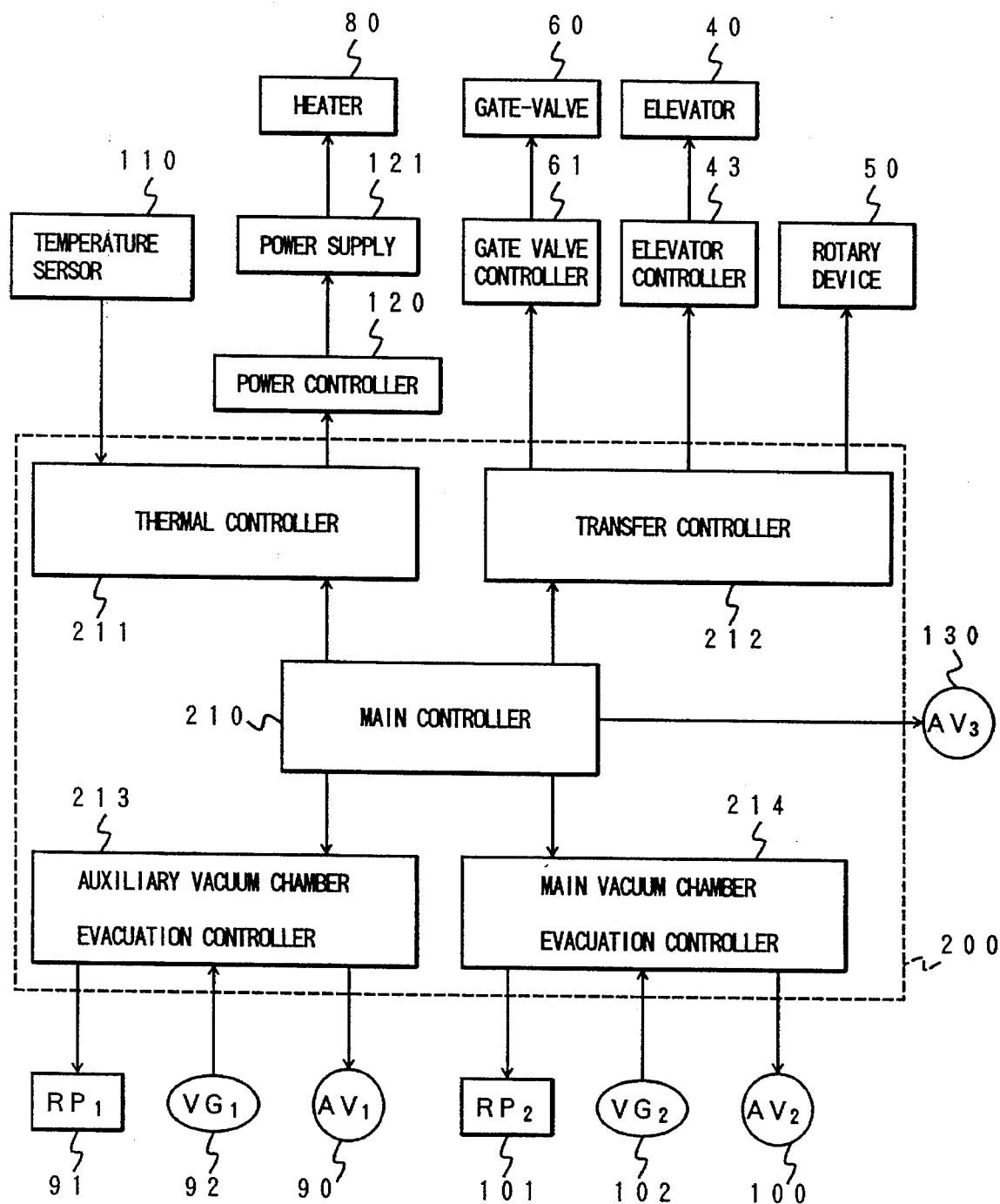
FIG. 10 is a block diagram for explaining the control of a computer.

Next, explanation will be hereinbelow made of the control for the apparatus according to the present invention with the use of a computer 200 shown in FIG. 1. With the apparatus using the computer 200, the preform can be automatically sintered. FIG. 10 is a block diagram illustrating a control system constituted by the computer 200. FIG. 1 does not clearly show that the third air valve 130, the first rotary pump 91 and the secondary rotary pump 110 are not connected to the computer 200, for the sake of brevity. However, when FIG. 10 is observed, it is understood that the third air valve 130, the first rotary pump 91 and the secondary rotary pump 101 are connected to the computer 200.

The computer 200 controls the apparatus according to this invention so as to automatically sinter the preform PF. The computer 200 is composed of a main controller 201, and a thermal controller 211, a transfer controller 212, an auxiliary vacuum chamber evacuation controller 213 and a main vacuum chamber evacuation controller 214 which are controlled by the main controller 210.

The thermal controller 211 (which will be simply denoted as "the controller 211 )", monitors the temperature of the inside of the main vacuum chamber 20 by means of the temperature sensor 110.

The power controller 120 controls the degree of power fed to the heater system 80 from the power supply 121. Under an instruction from the main controller 210, the controller 211 can set the temperature of the inside of the main vacuum chamber 20 at a predetermined value. That is, when the temperature detected by the temperature sensor 110 is lower than that instructed by the main controller 210, the controller 211 controls the power controller 120 so as to increase the degree of power fed to the heater system 80 from the power supply 121. On the contrary, when the temperature detected by the temperature sensor 110 is higher than that instructed by the main controller 210, the controller 211 controls the power controller 120 so as to decrease the degree of power fed to the heater system 80 from power supply 121.

The transfer controller 212 (which will be hereinbelow simply denoted as "the controller 212") controls the gate valve 60 so as to open and close the gate valve 60. The controller 212 controls the elevator controller 43 so as to move the elevator up and down. The controller 212 controls the rotary device so as to rotate the preform PF.

The auxiliary vacuum chamber controller 213 (which will be simply denoted as "the controller 213") controls the first rotary pump 91. The controller 213 monitors the gas pressure of the inside of the auxiliary vacuum chamber 30 by means of the vacuum gage 92, and controls the opening and closing of the air valve 90.

The main vacuum chamber controller 214 (which will be hereinbelow simply denote as "the controller 214"), controls the second rotary pump 101. The controller 214 also monitors the gas pressure of the inside of the main vacuum chamber 20 by means of the vacuum gage 102, and therefore control the opening and closing of the air valve 100.

Referring to flow-charts shown in the FIG. 11 to FIG. 12, the control by the computer 200 will be explained hereinbelow.

Figure 11:
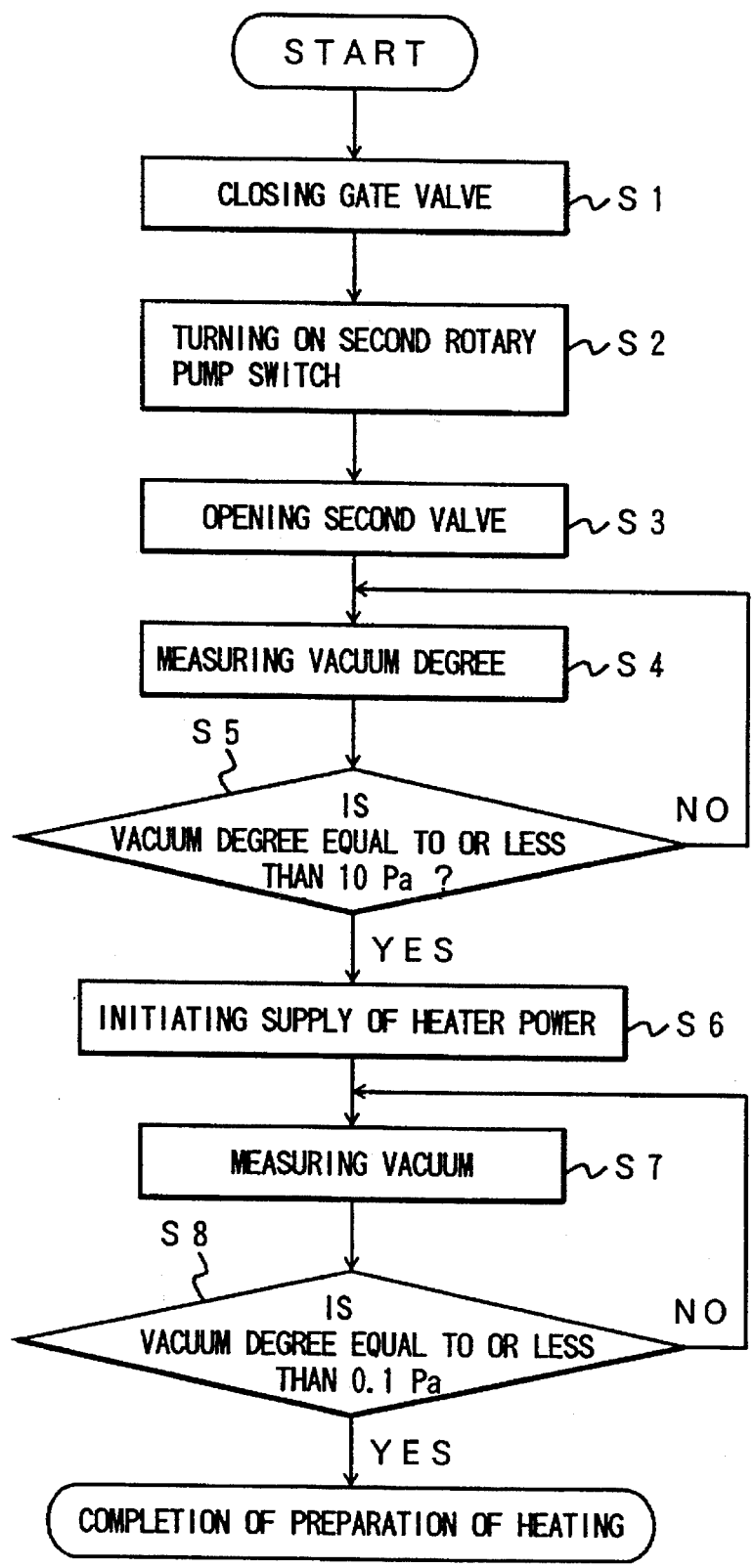
FIG. 11 is a flow-chart for explaining the control of the computer.

FIG. 11 is a flow-chart showing a procedure through which the main vacuum chamber 20 is started. In an initial condition, the soot preform PF is set in the auxiliary chamber 30, and the door 31 is closed while the gate valve 60 is opened. In this condition, the valves 90, 100, 130 are closed, the rotary pumps 91, 101 are stopped, while no power is fed to the heater system 80.

At step 1, under an instruction from the main controller 210, the gate valve controller 61 closes the gate valve 60. At step 2, under an instruction from the main controller 210, the controller 214 starts the second rotary pump 101. Since the valve 100 is closed, gas is exhausted from the range extending from the second rotary pump 101 to the valve 100. At step 3, under an instruction from the main controller 210, the second valve 100 is opened, and accordingly, gas in the main vacuum chamber 20 is evacuated with the second rotary pump 101.

At step 4, under an instruction from the main controller 210, the controller 214 monitors the vacuum degree in the main vacuum chamber 20 by means of the second vacuum gage 102. At step 5, the controller 214 determines whether or not the vacuum degree monitored by the vacuum gage 102 comes to a first predetermined value (10 Pa). When the degree of vacuum monitored by the second vacuum gage 102 comes to the first predetermined value, the main controller 210 indicates to the device 211 that the degree of vacuum reaches the first predetermined value, and instructs a temperature to which the inside of the main vacuum chamber 20 is heated up, to the controller 211.

At step 6, under an instruction from the main controller 210, the controller 211 controls the power controller 120 so as to increased the power fed to the heater system 80 from the power supply 121. Since the temperature sensor 110 monitors the temperature of the inside of the main vacuum chamber 20, the temperature of the inside of the main vacuum chamber 20 can be set to the temperature (for example 800 deg. C.) as instructed by the main controller 210 as mentioned above.

At step 7, under an instruction from the main controller 210, the controller 214 monitors the degree of vacuum in the main vacuum chamber 20 by means of the second vacuum gage 102. At step 8, the controller 212 determines whether or not degree of vacuum monitored by the second vacuum gage 102 comes to a second predetermined value (for example 0.1 Pa), that is, the first predetermined value is greater than the second predetermined value.

When the degree of vacuum monitored by the second vacuum gage 102 comes to the second predetermined value, the main controller 210 indicates to the controller 213 that the degree of vacuum in the main vacuum chamber 20 comes to the second predetermined value. Thus, the main vacuum chamber 20 is started as mentioned above.

Figure 12:
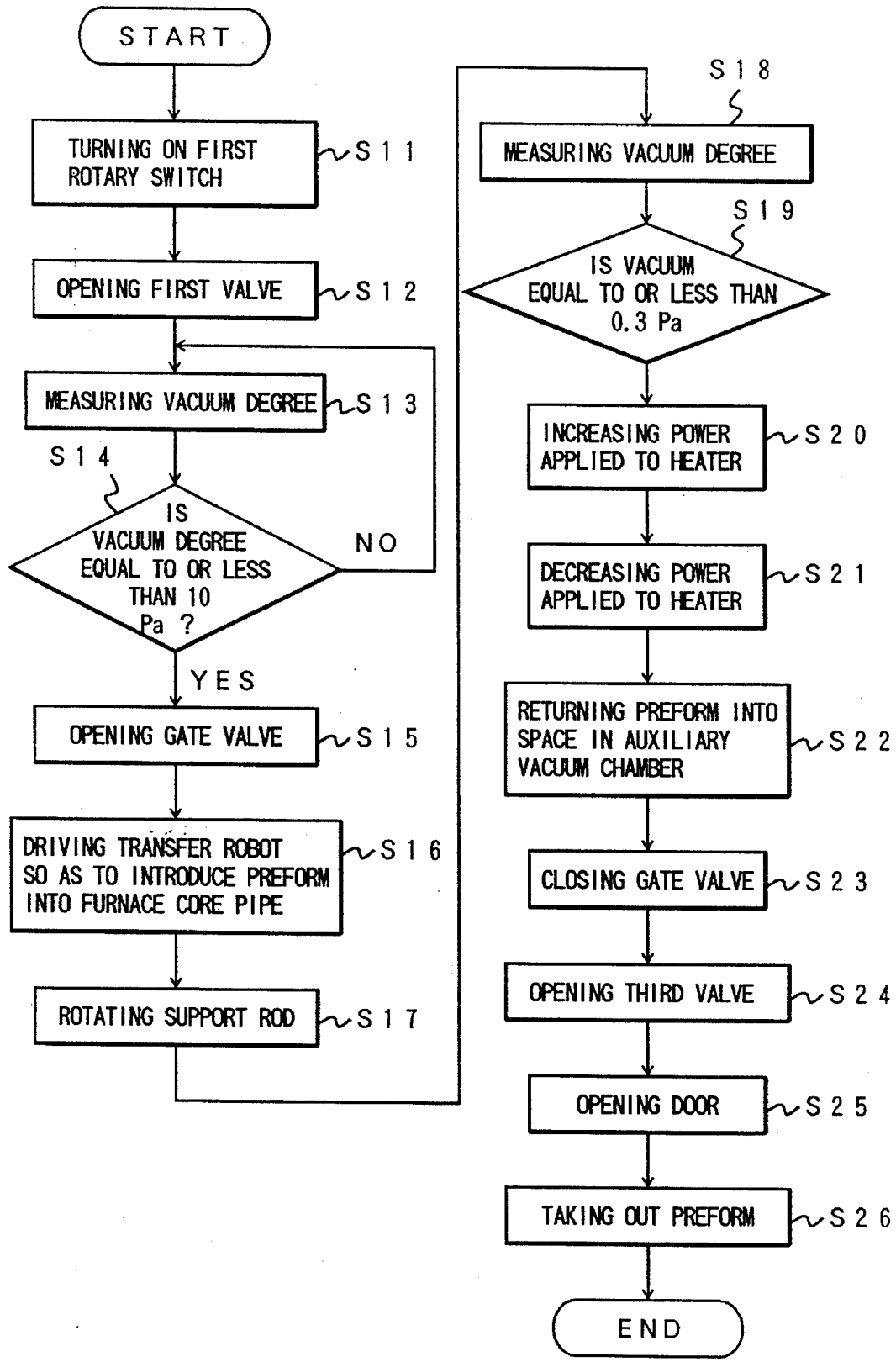
FIG. 12 is a flow-chart for explaining the control of the computer.

FIG. 12 is a flow-chart which shows a procedure until the preform is sintered after the main vacuum chamber 20 is started.

At step 11, under an instruction from the main controller 210, the controller 213 starts the first rotary pump 91. Since the valve 90 is closed, gas in the range extending from the first rotary pump 91 to the valve 90 is exhausted with the first rotary pump 91. At step 12, under an instruction from the main controller 210, the controller 213 opens the valve 90, and accordingly, gas in the auxiliary vacuum chamber 30 is exhausted with the first rotary pump 91.

At step 13, under the control of the main controller 210, the controller 213 monitors the degree of vacuum in the auxiliary vacuum chamber 30 by means of the first vacuum gage 92. At step 14, the controller 213 determines whether or not the degree of vacuum monitored by the first vacuum gage 92 comes to a first predetermined value (10 Pa).

When the degree of vacuum monitored by the first vacuum gage 92 comes to the first predetermined value, the main controller 210 indicates to the controller 212 that the degree of vacuum in the auxiliary vacuum chamber 30 comes to the first predetermined value.

At step 15, under an instruction from the main controller 210, the controller 212 controls the gate valve controller 61 so as to open the gate valve 60. At step 16, transfer robot 300 is driven so as to introduce the preform PF into the main chamber. Under an instruction from the main controller 210, the controller 212 controls the elevator controller 43 so as to lower the elevator. Accordingly, the soot preform PF is introduced into the inside of the muffle tube 70 in the main vacuum chamber 20 from the auxiliary vacuum chamber 30, and is then heated.

At step 17, under an instruction from the main controller 210, the controller 212 controls the rotary device 50 so as to rotate the preform PF. Within the muffle tube 70, the soot preform PF is heated while it is rotated. Accordingly, the preform PF is thermally cleaned so that unnecessary moisture and impurities contained in the soot preform PF are removed. During the thermal cleaning, the gas pressure in the main vacuum chamber 20 increases.

At step 18, under an instruction from the main controller 210, the controller 214 monitors the degree of vacuum in the main vacuum chamber by means of the second vacuum gage 102. At step 19, the controller 214 determines whether or not the degree of vacuum monitored by the second vacuum gage 102 comes to a third predetermined value (for example 0.3 Pa).

When the degree of vacuum monitored by the second vacuum gage 102 comes to the third predetermined value, the main controller 210 indicates to the controller 211 that the degree of vacuum in the main vacuum chamber 20 comes to the third predetermined value, and instructs a temperature to which the inside of the main vacuum chamber 20 is heated up. At step 20, under an instruction from the main controller 210, the controller 211 controls the power controller 120 so as to increase the power fed to the heater system 80 from the power supply 121.

Since the temperature sensor 211 monitors the temperature of the inside of the main vacuum chamber 20, the temperature of the inside of the main vacuum chamber 20 is set at a temperature (for example 1,500 deg. C.) as instructed by the main controller 210. This instructed temperature is enough to vitrify the soot preform PF, and accordingly, the soot preform PF is vitrified.

At step 22, under an instruction from the main controller 210, the elevator controller 43 in the transfer robot is controlled so as to elevate the elevator 40. Thus, the soot preform PF is shifted from the main vacuum chamber 20 into the auxiliary vacuum chamber 30.

At step 23, under an instruction from the main controller 210, the gate valve controller 61 is controlled so as to close the gate valve 60. At step 25, under an instruction from the main controller 210, the third leak valve 130 is opened so that the pressure in the auxiliary vacuum chamber 30 becomes equal to the atmospheric pressure. At step 25, the door 31 is opened, and then the preform PF is taken out from the auxiliary vacuum chamber 30.

Next explanation will be made of advantages obtained by the apparatus according to the present invention in view of experiments as follows.

Figure 13:
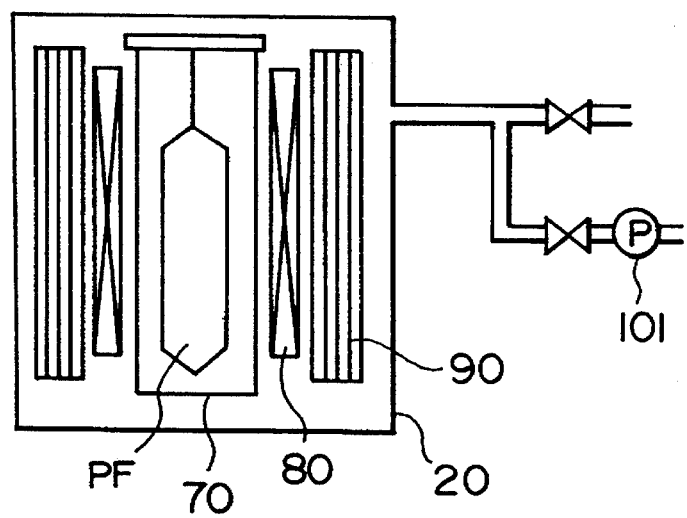
FIG. 13 is an explanatory view for a main vacuum chamber in the apparatus shown in FIG. 1.

FIG. 13 is an explanatory view illustrating the main vacuum chamber 20 in the apparatus shown in FIG. 1, and peripheral units therearound.

The preform PF used in this experiment was produced by a VAD process. The soot preform PF made of a porous glass had a diameter of 250 mm, a length of 500 mm.

Figure 15:
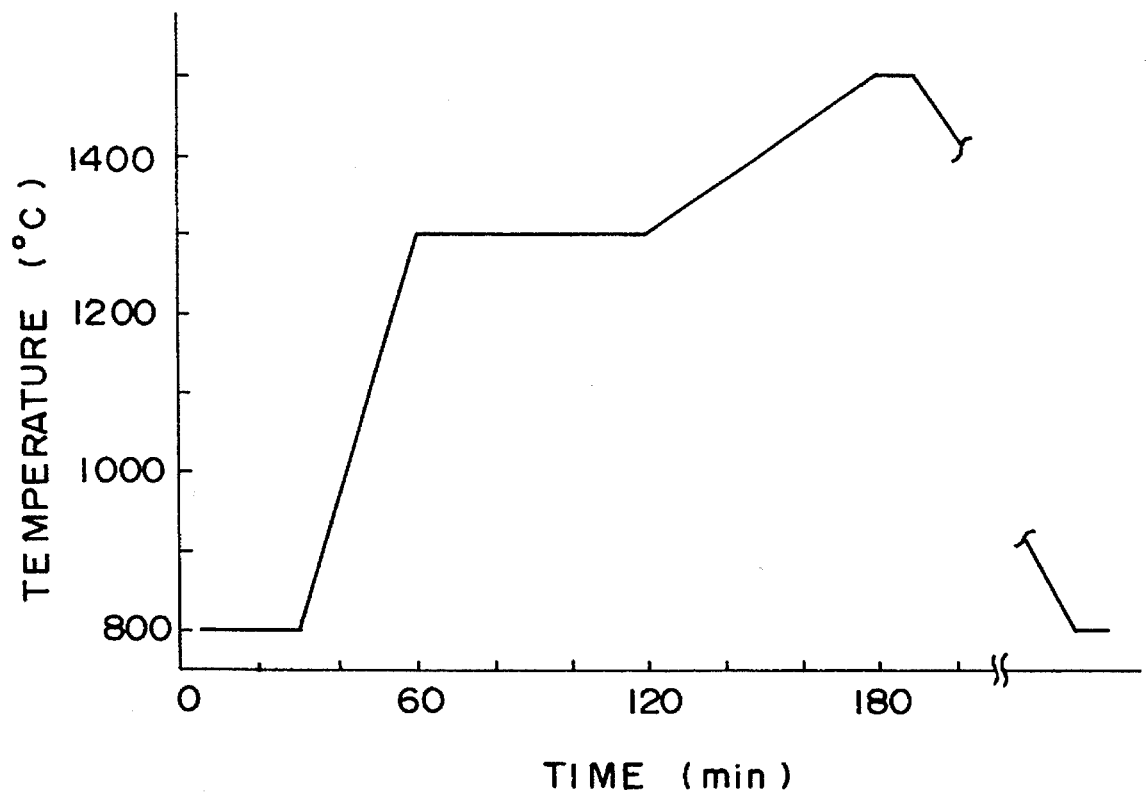
FIG. 15 is a graph showing the time-schedule of the temperature of the inside of the main vacuum chamber.

This porous soot boule or preform PF was introduced into the muffle tube 70, and was preliminarily sintered at a temperature of 1,300 deg. C. for 23 hours, as shown by a graph in FIG. 15. Thereafter, the soot preform PF was heated at a temperature of 1,550 deg. C. for 15 minutes. The porous glass part of the soot preform PF was vitrified so as to obtain a dense glass preform PF. With the repetitions of the above-mentioned procedure, several dense glass preforms PF were obtained.

Figure 14:
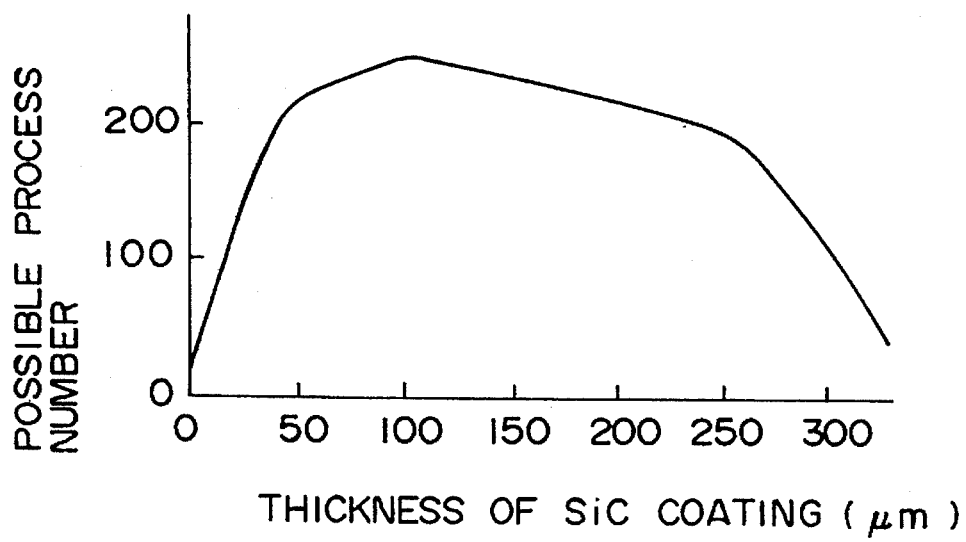
FIG. 14 is a graph showing the relationship between thickness of a silicon carbide and the number of preforms which can be process.

FIG. 14 is a graph showing the relationship between the thickness of the SiC layer with which the muffle tube 70 is covered, and the number of vitrified preforms PF which had satisfactory qualities and could be obtained by the muffle tube 70 covered with the SiC layer. As clearly understood from FIG. 14, more than 200 of preforms PF can be produced with the use of the muffle tube 70 covered with the SiC layer having a thickness in a range of 50 to 250 µm. it is noted that the preform having a satisfactory quality is defined in such a way that an optical fiber having a transmission loss of less than 0.360 dB/Km at 1.3 µm.

If the muffle tube 70 having high purity graphite and inner surface of the muffle tube 70 being covered with an SiC layer having a thickness of 100 µm was used, 240 of preforms having satisfactory qualities could be produced. However, if the number of preforms PF exceeded 240, abnormalities such as blackening points or air bubbles were found on the outer surfaces of the vitrified bodies of the preforms PF, and the examination of the muffle tube 70 indicated that the SiC layer vanished.

When the muffle tube 70 having high purity graphite and inner surface of the muffle tube 70 being covered with an SiC layer having a thickness of 300 µm was used, 100 of preforms having satisfactory qualities could be produced. The vitrified surfaces of the preforms were examined. Blackening points or air bubbles were found on the outer surfaces of the vitrified bodies of the preforms PF which were produced after the above-mentioned 100 of preforms PF were produced, and the examination of the muffle tube 70 indicated that the SiC layer was peeled off at several positions.

Further, if the preforms PF were produced with the use of the resilient member 74 shown in FIG. 7, as made in the above-mentioned experiments, the use life of the muffle tube 70 during which preforms having satisfactory qualities can be produced, was increased to be 1.2 times as long as that of a conventional one in which no resilient member 74 was used. Further, the consumption power of the apparatus in which the resilient member 74 was used in the muffle tube 70 was increased so as to be 0.9 times as high as that of a conventional one in which no resilient member 74 is used in the muffle tube 70.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for vitrifying a soot preform of an optical fiber, said apparatus comprising:

a main vacuum chamber adapted to be set at a first condition of a predetermined pressure;

a muffle tube, for accommodating said soot preform, provided in said main vacuum chamber, said muffle tube including a graphite tube with a base and a SiC layer covering an inner wall of said graphite tube;

a heater system for heating said soot preform, said heater system provided in said main vacuum chamber and located so as to surround said muffle tube;

an auxiliary vacuum chamber adapted to be set at a second condition of a predetermined pressure, said auxiliary vacuum chamber attached to said main vacuum chamber; and a transfer robot for supporting and rotating said soot preform, said transfer robot transferring said soot preform from said main vacuum chamber to said auxiliary vacuum chamber, said transfer robot including a holding member made of graphite and a cover member having a through hole through which said holding member extends, and wherein said holding member has a shape such that a column having a diameter larger than that of said through hole in said cover member is combined with a column having a diameter smaller than that of said through hole in said cover member; and a rod for jointing said soot preform to said transfer robot, said rod surrounded by said soot preform, said holding member holding said rod;

wherein said soot preform accommodated in said muffle tube is vitrified by heating under negative pressure.

2. An apparatus as set forth in claim 1, wherein said auxiliary vacuum chamber comprises an auxiliary vacuum chamber body and a door which is mounted at one side surface of said auxiliary vacuum chamber body so as to be openable and closable.

3. An apparatus as set forth in claim 2, wherein said auxiliary vacuum chamber further comprising a door seal interposed between said door and said auxiliary vacuum chamber body.

4. An apparatus as set forth in claim 1, wherein said holding member has a recess having a size such as to allow said rod to be fitted therein.

5. An apparatus as set forth in claim 4, wherein a surface of said holding member is coated with silicon carbide.

6. An apparatus as set forth in claim 4, wherein said holding member has through-holes piercing from an inner wall surface of said recess to an outer wall surface of said holding member.

7. An apparatus as set forth in claim 1, wherein said transfer robot further comprises a support rod connected to said holding member, a rotary device for rotating said support rod around its axis, and an elevator for moving said support rod longitudinally of said muffle tube.

8. An apparatus for vitrifying a soot preform that coats a seed rod, comprising:

a main vacuum chamber adapted to be set to a first pressure;

a graphite tube for accommodating said soot preform, disposed in said main vacuum chamber;

a silicon carbide layer coating the surface of said graphite tube;

a heater system for heating said graphite tube, and being disposed so as to surround an outer surface of said graphite tube;

an auxiliary vacuum chamber adapted to be set to a second pressure, and being attached to said main vacuum chamber; and a transfer robot for transferring said soot preform between said main vacuum chamber and said auxiliary vacuum chamber, by moving said seed rod in the axial direction of said seed rod, wherein said transfer robot has a holding member that holds the seed rod and a cover member having a through hole through which said holding member extends;

wherein said holding member includes a first column having a diameter larger than that of said through hole of said cover member and a second column having a diameter smaller than that of said through hole of said cover member; and wherein said first column supports said cover member until said cover member contacts said main vacuum chamber.

9. An apparatus as set forth in claim 1 or 8, wherein said cover member is made of graphite.

10. An apparatus as set forth in claim 1 or 8, wherein said cover member is made of graphite and coated with silicon carbide.

11. An apparatus as set forth in claim 1, wherein said muffle tube comprises a first cylindrical member, a second cylindrical member attached on said first cylindrical member so that said first and second members constitute a cylinder, and a seal interposed between said first and second members.

12. An apparatus as set forth in claim 10, wherein said seal is formed of a resilient member containing carbon.

13. An apparatus as set forth in claim 11, wherein said muffle tube further comprises a cup-like third member attached underneath said first member.

14. An apparatus as set forth in claim 1, wherein said silicon carbide layer has a thickness of 50 to 250 μm.

15. An apparatus as set forth in claim 1, further comprising a heat insulator laid around said heater system located in said main vacuum chamber.

16. An apparatus as set forth in claim 15, wherein said heat insulator is made of graphite.

17. An apparatus as set forth in claim 1 or 8, further comprising a first exhaust device for exhausting gas from said auxiliary vacuum chamber, and a second exhaust device for exhausting gas from said main vacuum chamber.

18. An apparatus for vitrifying a soot preform of an optical fiber, said apparatus comprising:

a main vacuum chamber adapted to be set at a first condition of a predetermined pressure;

a muffle tube, for accommodating said soot preform, provided in said main vacuum chamber, said muffle tube including a graphite tube with a base and a SiC layer covering an inner wall of said graphite tube;

a heater system for heating said soot preform, said heater system provided in said main vacuum chamber and located so as to surround said muffle tube;

an auxiliary vacuum chamber adapted to be set at a second condition of a predetermined pressure, said auxiliary vacuum chamber being attached to said main vacuum chamber;

a transfer robot for supporting and rotating said soot preform, said transfer robot transferring said soot preform from said main vacuum chamber to said auxiliary vacuum chamber, wherein said transfer robot includes a holding member made of graphite;

a rod for jointing said soot preform to said transfer robot, said rod surrounded by said soot preform, said holding member holding said rod;

a first exhaust device for exhausting gas from said auxiliary vacuum chamber, and a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of vacuum in said auxiliary vacuum chamber; and a computer connected to said first vacuum gage and said gate valve controller;

wherein said soot preform accommodated in said muffle tube is vitrified by heating under negative pressure.

19. An apparatus as set forth in claim 18, wherein said computer controls said gate valve controller so as to open said gate valve when a degree of vacuum in said auxiliary vacuum chamber measured by said first vacuum gage comes to a predetermined value.

20. An apparatus for vitrifying a soot preform of an optical fiber, said apparatus comprising:

a main vacuum chamber adapted to be set at a first condition of a predetermined pressure;

a muffle tube, for accommodating said soot preform, provided in said main vacuum chamber, said muffle tube including a graphite tube with a base and a sic layer covering an inner wall of said graphite tube;

a heater system for heating said soot preform, said heater system provided in said main vacuum chamber and located so as to surround said muffle tube;

an auxiliary vacuum chamber adapted to be set at a second condition of a predetermined pressure, said auxiliary vacuum chamber attached to said main vacuum chamber;

a transfer robot for supporting and rotating said soot preform, said transfer robot transferring said soot preform from said main vacuum chamber to said auxiliary vacuum chamber, wherein said transfer robot includes a holding member made of graphite, a support rod connected to said holding member, a rotary device for rotating said support rod around a longitudinal axis of said support rod, and an elevator for moving said support rod along an axial direction of said support rod;

a rod for jointing said soot preform to said transfer robot, said rod surrounded by said soot preform, said holding member holding said rod;

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of vacuum in said auxiliary vacuum chamber;

an elevator controller for controlling elevation of said elevator; and a computer connected to said first vacuum gage, said gate valve controller, said elevator controller and said rotary device;

wherein said soot preform accommodated in said muffle tube is vitrified by heating under negative pressure.

21. An apparatus as set forth in claim 20, wherein said computer controls said gate valve controller so as to open said gate valve when a degree of vacuum in said auxiliary vacuum chamber measured by said first vacuum gage comes to a predetermined value, also controls said elevator controller so as to shift said preform into said main vacuum chamber, and further controls said rotary device so as to rotate said preform.

22. An apparatus for vitrifying a soot preform of an optical fiber, said apparatus comprising:

a main vacuum chamber adapted to be set at a first condition of a predetermined pressure;

a muffle tube, for accommodating said soot preform, provided in said main vacuum chamber, said muffle tube including a graphite tube with a base and a SiC layer covering an inner wall of said graphite tube;

a heater system for heating said soot preform, said heater system provided in said main vacuum chamber and located so as to surround said muffle tube;

an auxiliary vacuum chamber adapted to be set at a second condition of a predetermined pressure, said auxiliary vacuum chamber attached to said main vacuum chamber;

a transfer robot for supporting and rotating said soot preform, said transfer robot transferring said soot preform from said main vacuum chamber to said auxiliary vacuum chamber, wherein said transfer member includes a holding member made of graphite, a support rod connected to said holding member, a rotary device for rotating said support rod around a longitudinal axis of said support rod, and an elevator for moving said support rod along an axial direction of said support rod;

a rod for jointing said soot preform to said transfer robot, said rod surrounded by said soot preform, said holding member holding said rod;

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of pressure in said auxiliary vacuum chamber;

an elevator controller for controlling elevation of said elevator;

a power supply connected to said heater system;

a power controller connected to said power supply and said heating system, for controlling a degree of power fed to said heater system from said power supply;

a temperature sensor for measuring a temperature in said main vacuum chamber; and a computer connected to said first vacuum gage, said gate valve controller, said elevator controller and said rotary device, said power controller and said temperature sensor;

wherein said soot preform accommodated in said muffle tube is vitrified by heating under negative pressure.

23. An apparatus as set forth in claim 22, wherein said computer controls said gate valve controller so as to open said gate valve when a degree of vacuum in said auxiliary vacuum chamber measured by said first vacuum gage comes to a predetermined value, also controls said elevator controller so as to shift said preform into said main vacuum chamber, further controls said rotary device so as to rotate said preform, controls said power controller so as to increase the degree of power fed to said heater system, controls said elevator so as to shift said preform into said auxiliary vacuum chamber after a time by which said preform is vitrified elapses from the time when a temperature in said main vacuum chamber measured by said temperature sensor come to a value which is enough to vitrify said preform, and controls said gate valve controller so as to close said gate valve.

24. An apparatus for vitrifying a soot preform of an optical fiber, said apparatus comprising:

a main vacuum chamber adapted to be set a first condition of a predetermined pressure;

a muffle tube, for accommodating said soot preform, provided in said main vacuum chamber;

a heater system for heating said soot preform, said heater system provided in said main vacuum chamber and located so as to surround said muffle tube;

an auxiliary vacuum chamber adapted to be set a second condition of a predetermined pressure, said auxiliary vacuum chamber attached to said main vacuum chamber;

a gate valve interposed between said main vacuum chamber and said auxiliary vacuum chamber so as to open and close a passage communicating between said main vacuum chamber and said auxiliary vacuum chamber;

a gate valve controller for controlling opening and closing of said gate valve;

a first exhaust device for exhausting gas from said auxiliary vacuum chamber;

a first vacuum gage for measuring a degree of vacuum in said auxiliary vacuum chamber; and a computer connected to said first vacuum gage and said gate valve controller, for controlling said gate valve controller so as to open said gate valve when the degree of vacuum in said auxiliary vacuum chamber measured with said first vacuum gage comes to a predetermined value.

25. An apparatus for vitrifying a soot preform of an optical fiber, said apparatus comprising:

a main vacuum chamber adapted to be set a first condition of a predetermined pressure;

a muffle tube, for accommodating said soot preform, provided in said main vacuum chamber;

a heater system for heating said soot preform, said heater system provided in said main vacuum chamber and located so as to surround said muffle tube;

an auxiliary vacuum chamber adapted to be set a second condition of a predetermined pressure, said auxiliary vacuum chamber attached to said main vacuum chamber;

a gate valve interposed between said main vacuum chamber and said auxiliary vacuum chamber so as to open and close a passage communicating between said main vacuum chamber and said auxiliary vacuum chamber;

a gate valve controller for controlling opening and closing of said gate valve;

a first exhaust device for exhausting gas from said auxiliary vacuum chamber;

a second exhaust device for exhausting gas from said main vacuum chamber;

a rod supporting said preform and surrounded by said preform a holding member for holding said rod;

a support rod connected to said holding member;

a rotary device attached to said support rod, for rotating said support rod around its axis;

an elevator for shifting said support rod along the longitudinal direction of said muffle tube;

an elevator controller for controlling elevation of said elevator;

a first vacuum gage for measuring a degree of vacuum in said auxiliary vacuum chamber; and a computer connected to said first vacuum gage, said gate valve controller, said elevator controller, and rotary device, for controlling said gate valve controller so as to open said gate valve when the degree of vacuum in said auxiliary vacuum chamber measured by said first vacuum gage comes to a predetermined value, for controlling said elevator controller so as to shift said preform into said main vacuum chamber, and for controlling said rotary device so as to rotate said preform.

26. An apparatus for vitrifying a soot preform which coats a seed rod, comprising:

a main vacuum chamber having an opening defined by an opening edge;

a tube for accommodating the soot preform, said tube being disposed in said main vacuum chamber;

a heater system for heating said tube, said heater system surrounding said tube;

an auxiliary vacuum chamber attached to said main vacuum chamber through said opening;

a support rod which is rotatable around its longitudinal axis, and transmittable along the longitudinal direction;

a cover member arranged in said auxiliary vacuum chamber, having a through hole; and a holding member fixed to said support rod and being movable with said support rod, said holding member having a first column and a second column, wherein the width of said first column is greater than that of the second column, wherein the first column includes a recess for holding the seed rod therein, wherein one of said second column and said support rod is disposed through said through hole of said cover member, wherein said cover member is supported by said opening edge of said main vacuum chamber when said holding member is lowered below a predetermined level, and wherein said first column supports said cover member when said holding member is lifted above said predetermined level.

27. An apparatus for vitrifying a soot preform which coats a seed rod, comprising:

a main vacuum constructed and arranged to be set to a first pressure;

a graphite tube for accommodating the soot preform disposed in said main vacuum chamber;

a silicon carbide layer coating on inner surface of said graphite tube;

a heater system for heating said graphite tube, said heater system surrounding an outer surface of said graphite tube;

an auxiliary vacuum chamber constructed and arranged to be set to a second pressure, said auxiliary vacuum chamber being attached to said main vacuum chamber;

a graphite tube for accommodating the soot preform, disposed in said main vacuum chamber;

a silicon carbide layer coating an inner surface of said graphite tube;

a heater system for heating said graphite tube, said heater system surrounding an outer surface of said graphite tube;

an auxiliary vacuum chamber constructed and arranged to be set to a second pressure, said auxiliary vacuum chamber being attached to said main vacuum chamber;

a transfer robot for transferring said soot preform between said main vacuum chamber and said auxiliary vacuum chamber, by moving said seed rod in an axial direction thereof, wherein said transfer robot includes a holding member for holding said seed rod, a support rod connected to said holding member, a rotary device for rotating said support rod around a longitudinal axis of said support rod, and an elevator for moving said support rod along said axial direction thereof;

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a transfer robot for transferring said soot preform between said main vacuum chamber and said auxiliary vacuum chamber, by moving the seed rod in an axial direction thereof, wherein said transfer robot includes a holding member for holding said seed rod, a support rod connected to said holding member, a rotary device for rotating said support rod around a longitudinal axis of said support rod, and an elevator for moving said support rod along said axial direction of said support rod;

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of pressure in said auxiliary vacuum chamber;

an elevator controller for controlling elevation of a power supply connected to said heater system;

a power controller connected between said power supply and said heater system, for controlling a degree of power fed to said heater system from said power supply;

a temperature sensor for measuring a temperature in said main vacuum chamber; and a computer connected to said first vacuum gage, said gate valve controller, said elevator controller and said rotary device, said power controller and said temperature sensor.

28. An apparatus as set forth in claim 8, wherein said holding member has a recess having a size such as to allow said rod to be fitted therein.

29. An apparatus as set forth in claim 28, wherein a surface of said holding member is coated with silicon carbide.

30. An apparatus as set forth in claim 28, wherein said holding member has through-holes piercing from an inner wall surface of said recess to an outer wall surface of said holding member.

31. An apparatus as set forth in claim 8, wherein said transfer robot further comprises a support rod connected to said holding member, a rotary device for rotating said support rod around its axis, and an elevator for moving said support rod longitudinally of said muffle tube.

32. An apparatus as set forth in claim 31, further comprising:

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of pressure in said auxiliary vacuum chamber;

an elevator controller for controlling elevation of said elevator; and a computer connected to said first vacuum gage, said gate valve controller, said elevator controller and said rotary device.

33. An apparatus as set forth in claim 32, wherein said computer controls said gate valve controller so as to open said gate valve when a degree of vacuum in said auxiliary vacuum chamber measured by said first vacuum gage comes to a predetermined value, also controls said elevator controller so as to shift said preform into said main vacuum chamber, and further controls said rotary device so as to rotate said preform.

34. An apparatus as set forth in claim 31, further comprising:

a first exhaust device for exhausting gas from said auxiliary vacuum chamber;

a second exhaust device for exhausting gas from said main vacuum chamber;

a gate valve located between said main vacuum chamber and said auxiliary vacuum chamber;

a gate valve controller for controlling opening and closing of said gate valve;

a first vacuum gage for measuring a degree of pressure in said auxiliary vacuum chamber;

an elevator controller for controlling elevation of said elevator;

a power supply connected to said heater system;

a power controller connected between said power supply and said heater system, for controlling a degree of power fed to said heater system from said power supply;

a temperature sensor for measuring a temperature in said main vacuum chamber; and a computer connected to said first vacuum gage, said gate valve controller, said elevator controller, said rotary device, said power controller and said temperature sensor.

35. An apparatus as claimed in claim 34, wherein said computer controls said gate valve controller so as to open said gate valve when a degree of vacuum in said auxiliary vacuum chamber measured by said first vacuum gage comes to a predetermined value, also controls said elevator controller so as to shift said preform into said main vacuum chamber, further controls said rotary device so as to rotate said preform, controls said power controller so as to increase the degree of power fed to said heater system, controls said elevator so as to shift said preform into said auxiliary vacuum chamber after a time by which said preform is vitrified elapses from the time when a temperature in said main vacuum chamber measured by said temperature sensor come to a value which is enough to vitrify said preform, and controls said gate valve controller so as to close said gate valve.

36. An apparatus as set forth in claim 26, wherein said computer controls said gate valve controller so as to open said gate valve when a degree of vacuum in said auxiliary vacuum chamber measured by said first vacuum gage comes to a predetermined value.

\* \* \* \* \*